United States Patent [19]

Wakebe et al.

[11] 4,143,557
[45] Mar. 13, 1979

[54] CONTROL SYSTEM FOR USE IN A MULTIPLE SPEED TRANSMISSION SYSTEM

[75] Inventors: Yoshitaka Wakebe; Hirofumi Matsumoto; Hiedo Momohara; Yasuyuki Tsuchida; Kazuhiro Tomoshige, all of Moriguchi, Japan

[73] Assignee: Sanyo Electric Co., Ltd, Osaka, Japan

[21] Appl. No.: 788,679

[22] Filed: Apr. 18, 1977

[51] Int. Cl.² ............................................. F16H 9/00
[52] U.S. Cl. ................................. 74/217 B; 280/236; 200/11 DA
[58] Field of Search ............... 74/217 B, 242, 335; 280/236, 261; 200/16 B, 11 J, 11 K, 11 DA

[56] References Cited

U.S. PATENT DOCUMENTS

| 3,048,670 | 8/1962 | Jackson | 200/11 G |
|---|---|---|---|
| 3,226,497 | 12/1965 | Terkoski | 200/11 G |
| 3,584,163 | 6/1971 | White | 200/11 G |
| 3,594,527 | 7/1971 | Brant | 200/11 G |
| 3,732,787 | 5/1973 | Yamaguchi | 280/236 |
| 3,736,390 | 5/1973 | Lockard | 200/11 DA |
| 3,884,317 | 5/1975 | Kinzel | 310/156 |
| 3,894,442 | 7/1975 | Hembree | 74/335 |
| 3,903,383 | 9/1975 | Marker | 200/11 G |
| 3,919,891 | 11/1975 | Stuhlmuller et al. | 74/217 B |
| 3,970,986 | 7/1976 | Seyler et al. | 200/11 G |
| 4,002,080 | 1/1977 | Huret et al. | 74/217 B |
| 4,041,788 | 8/1977 | Nininger, Jr. | 74/217 B |
| 4,065,983 | 1/1978 | Mimura | 280/236 |

FOREIGN PATENT DOCUMENTS

925257  5/1963  United Kingdom ............... 200/16 D

*Primary Examiner*—Samuel Scott
*Assistant Examiner*—William R. Henderson
*Attorney, Agent, or Firm*—Armstrong, Nikaido, Marmelstein & Kubovcik

[57] ABSTRACT

The control system of the present disclosure is particularly designed for use in the bicycle which is so designed as to change gears upon shifting of a chain guiding mechanism. The control system includes a motor driven reel, a flexible wire connected between the reel and the chain guiding mechanism and a switch arrangement for controlling the rotation of the reel. Upon turning on of the switch arrangement, the motor is rotated by a predetermined amount to perform a suitable shifting operation of the chain to engage with a required gear.

26 Claims, 22 Drawing Figures

CONTROL SYSTEM FOR USE IN A MULTIPLE SPEED TRANSMISSION SYSTEM

The present invention relates to a multiple speed transmission system, and more particularly to a control system for use in the multiple speed transmission system to be incorporated in vehicles such as bicycles.

In general, the multiple speed transmission system in the bicycle has a plurality of transmission gears fixedly and coaxially connected to a rear wheel and an endless chain passed around one of the transmission gears and a front gear which is to be connected with a pair of pedals. The plurality of transission gears are coaxially connected to each other and have their diameters arranged to have different sizes. For controlling the relative motion between the front gear and the rear wheel, the engagement of the endless chain with one of the plurality of transission gears is changed over to engage with another one of the plurality of transmission gears.

Such change over of the engagement is carried out by shifting means movably provided adjacent to the plurality of transmission gears for guiding and shifting, upon application of external shifting force, so that the endless chain passing therethrough is engaged with a required transmission gear. The external shifting is effected either by pulling the shifting means for performing a shift-down operation or by pushing the shifting means for performing a shift-up operation.

In the transmission system as described above, the external shifting force, substantially controlling the engagement, has been generally applied by a manual control system. For example, one and most commonly used type of the manual control system is such that the shifting means is connected to a lever through a flexible wire for applying the pulling force thereto, upon shifting the lever in one direction, while on the other hand, the shifting means is further connected to urging means for applying the pushing force thereto when the lever is shifted back in the other direction.

According to such conventional type of control system, a rider or an operator has to apply a comparatively high amount of manipulating force such as 5 to 6 kg for effecting the shifting operations during his ride on the bicycle, and yet during these operations, he has to have his one hand off from the handle. Thus, the rider may lose his balance on the bicycle or may tumble off the bicycle.

Therefore, a primary object of the present invention is to present an improved type of control system which can be readily operated without application of a high amount of the manipulating force.

It is another object of the present invention to provide a control system of the above described type which is simple in construction and accurate in functioning, and can be manufactured at low cost.

It is a further object of the present invention to provide a control system of the above described type which is compact in size and can be readily incorporated into vehicles such as bicycles.

It is yet a further object of the present invention to provide a control system of the above described type which has a switch assembly capable for being mounted on the bicycle, suitably on the handle thereof and being connected with the control system through the least necessary a number of lead wires each corresponding with one engaged position of the transmission gear.

According to the control system of the present invention, the shifting means is connected, through a flexible wire, to a motor driven reel for winding up the flexible wire when it is necessary to perform the shift-down operation and for extracting the wound wire when it is necessary to perform the shift-up operation. These operations are carried out by a various switch arrangements and controlling members to be connected to the motor.

The control system of the present invention has a source of power such as batteries and the motor driven reel, including the reversible motor, is incorporated in a control box to be fixedly provided on the frame of the bicycle, preferably at a position below the rear body. A disk member is fixedly provided on the reel for simultaneously rotating the disk together with the reel. Secured to the peripheral edge portion of the disk is a contact member which has at least one portion opened for obtaining a disconnecting space. Disposed around the disk is a plurality of brush members spaced from each other by a predetermined distance and so positioned as to contact the peripheral edge of the disk during its rotation and at its stopped position. The number of the brush members coincide with the number of the transmission gears. Each of the brushes is connected to a separate terminal to be incorporated in a switch arrangement which is provided adjacent to a grip of a handle of the bicycle for easy manipulation thereof. One of the separate terminals is selectively connected with a main terminal which is connected to the motor and further to the batteries, and in turn the batteries are connected to the contact member.

When it is desired to perform the shifting operation, the rider turns the switch arrangement to connect the main terminal with any one of the separate terminals. Then, the current starts to flow through the establish closed circuit of the batteries, motor, main terminal, selected terminal, brush corresponding with the selected terminal, contact member, and batteries. Thus, the motor is rotated to wind up the flexible wire onto the reel or let the wire out therefrom to perform the shifting operation. During the shifting operation, the disk is also rotated and the established closed circuit is maintained. After the reel, i.e., the disk, has been rotated by a predetermined amount, the selected terminal comes into contact with the opened space or the disconnecting space, whereby the established closed circuit is opened to stop the rotation of the motor, thus one shifting operation being completed.

The batteries are so connected as to provide the current in one direction to rotate the motor in one direction during the shift-up operation, and on the other hand, the batteries provide the current in the other direction to rotate the motor in the other direction during the shift-down operation.

Since the control system of the present invention carries out the shifting operations by the shifting force of motor driven reel, it is not required to apply the high amount of manipulating force.

Furthermore, since the switch arrangement is provided closely adjacent to the grip, the rider does not have to have his hand off from the grip, but merely a finger tip operation is sufficient for actuating the switch arrangement.

Therefore, there is no danger for the rider to lose his balance during his ride on the bicycle.

These and other objects and features of the present invention will become apparent from the following descriptions taken in conjunction with several preferred form of embodiments thereof shown in the accompanying drawings, in which;

FIG. 6a is a top plan view of a second switch unit to be incorporated in the switch arrangement shown in FIG. 5;

FIG. 6b is a cross sectional view taken along the line VI—VI shown in FIG. 6a;

FIG. 7 is an exploded view of the second switch unit shown in FIG. 6a;

FIGS. 8a and 8b are schematic views of the terminal members to be incorporated in the second switch unit;

Before the description of the present invention proceeds, it is to be noted that like parts are designated by like reference numerals throughout several views of the accompanying drawings unless the like parts are described as designated by unlike reference numerals.

Figure 1:
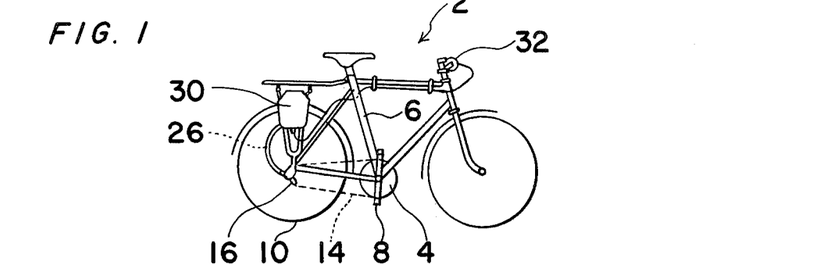
FIG. 1 is a schematic side view of the bicycle to which the control system of the present invention may be applied.

Referring to the drawings, in FIG. 1, a control system for use in a multiple speed transmission system of the present invention is incorporated in a bicycle 2 of an ordinary multiple speed type bicycle having a power transmission mechanism defining a power delivery path between a driving member and a driven member for controlling the relative motion between the driving member and the driven member. The driving member of the bicycle includes a front gear 4 rotatably mounted on a frame 6 and a pedal 8 fixedly connected to the front gear 4 while the driven member includes a rear wheel 10 rotatably mounted on the frame 6. The power transmission mechanism provided between the driving member and the driven member includes a plurality of transmission gears 12 which are coaxially and fixedly connected to the rear wheel 10 as most clearly seen in FIG. 2 Part C, an endless chain 14 passed around the front gear 4 and one of the transmission gears 12 and means for shifting the endless chain from one engaged position to another engaged position, upon receipt of mechanical signal from the control system of the present invention.

The shifting means includes a chain guiding member 16 and a shifting member for shifting the guiding member 16.

Before the description for the control system of the present invention proceeds, the power transmission mechanism, particularly the engagement between the endless chain 14 and the transmission gears 12 is described first for the sake of clear understanding of the control system of the present invention.

Figure 2:
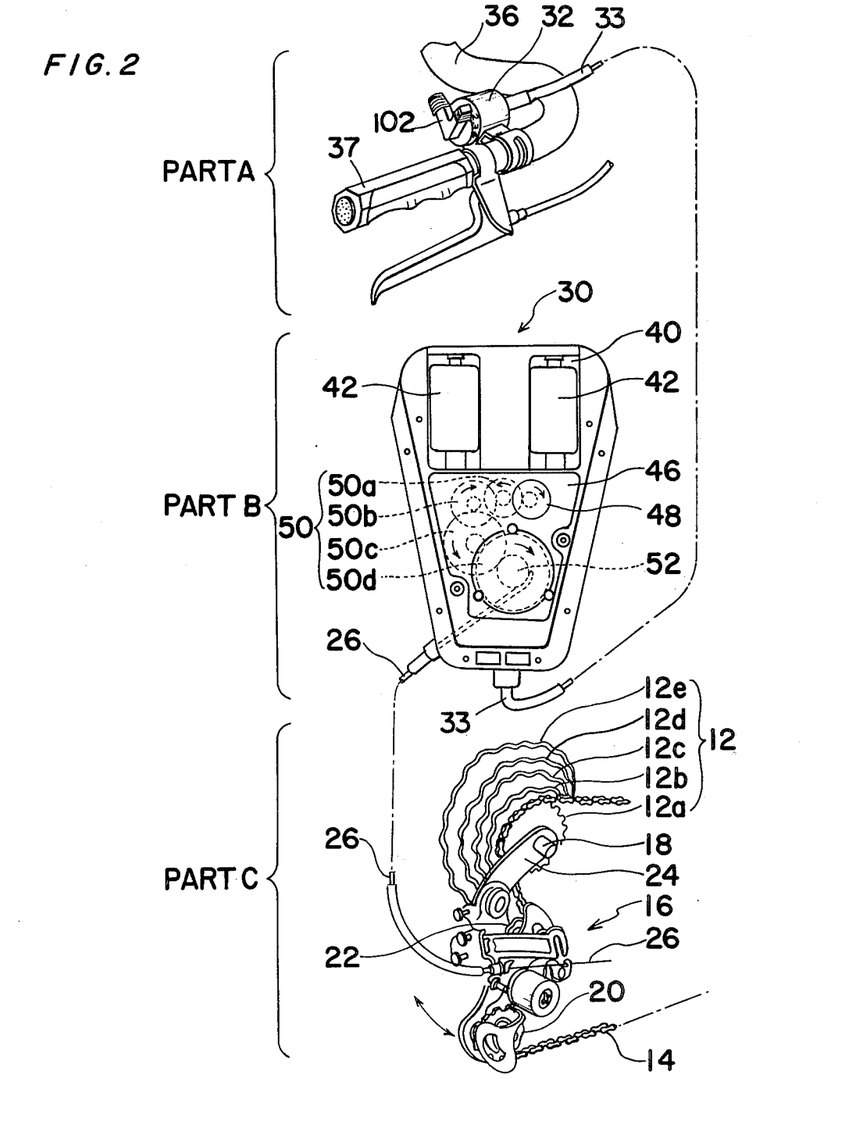
FIG. 2 is a partial diagrammatic view in which a part A is a fragmentary perspective view of a handle portion of the bicycle of FIG. 1, a part B is a front view of the control box and a part C is a perspective view of the transmission gears, and particularly shows relation between the parts A, B and C.

Referring to FIG. 2, particularly to part C thereof, the transmission gears 12 comprises a first gear 12a, a second gear 12b, a third gear 12c, a fourth gear 12d and a fifth gear 12e which are coaxially and fixedly mounted on a shaft 18 integrally formed with or fixedly mounted to a shaft of the rear wheel 10 to extend from the latter. As is apparent from FIG. 2 Part C, the first gear 12a provided at outermost side has the smallest diameter of all the gears 12a, 12b, 12c, 12d and 12e, while the fifth gear 12e provided at innermost side has the largest diameter of all the gears, and the gears provided between the gears 12a and 12e have their diameter increased gradually towards the inner side. When the chain 14 is engaged with the first gear 12a, the highest instantaneous force is transmitted to the rear wheel 10, while on the other hand, when the chain 14 is engaged with the fifth gear 12e, the smallest instantaneous force is transmitted to the rear wheel 10. Provided adjacent to the gears 12 is a chain shifting mechanism including the guiding member 16 having two auxiliary gears 20 and 22 for holding the endless chain 14 passing through the guiding member 16. The guiding member 16 is movably connected to the shaft 18 at the end portion thereof through a bar member 24 for moving the guiding member 16 between a shifted position and a retreated position, and is normally biased, by suitable urging means 25, as shown in FIGS. 4a and 4b, to force the guiding member 16 towards the retreated position. The guiding member 16 is further connected to a flexible wire 26 extended from the control system of the present invention for moving the guiding member 16 towards the shifted position upon receipt of pulling force applied thereto through the flexible wire 26 and for moving the guiding member 16 towards the retreated position when the flexible wire is loosened. The wire 26 and the urging means 25 construct the shifting member. When the guiding member 16 is moved to the retreated position, as is schematically shown in FIG. 4a, the auxiliary gears 20 and 22 guide the endless chain 14 to engage with the first gear 12a, and when the guiding member 16 is moved to the shifted position, as is schematically shown in FIG. 4b, the auxiliary gears 20 and 22 guide the endless chain 14 to engage with the fifth gear 12e. Such movement of the guiding member 16 is described later in connection with FIG. 3.

It is to be noted that the shift of the endless chain 14 from one engaged position with one of the five gears to another engaged position with a larger size gear thereof is referred to as a shift-down operation, while the shift of the endless chain 14 from one engaged position with one of the five gears to another engaged position with a smaller size gear thereof is referred to as a shift-up operation, hereinbelow.

Referring back to FIG. 2, the control system of the present invention includes a control box 30 provided, as clearly seen in FIG. 1, on the frame 6 of the bicycle at the rear body thereof for pulling or loosening the flexible wire 26 connected to the guiding means 16, upon receipt of signal from a switch arrangement 32 provided on a handle 36 and closely adjecent to a grip 37 of the bicycle 2.

The control box 30 is divided into two chambers; an upper chamber 40 for installing therein a power source such as battery 42 and a lower chamber 46 for installing therein a reversible motor such as DC motor 48 and a reduction gears 50 connected to the motor 48. The reduction gear 50 includes a first gear 50a, a second gear 50b, a third gear 50c and a fourth gear 50d which are listed in an order of small size gear to a large size gear and are provided for reducing the number of revolution of the motor 48 and for increasing a rotating torque of a shaft (not shown) of the fourth gear 50d. Provided to the shaft of the fourth gear 50d is a reel 52 which is connected to one end of the flexible wire 26 for pulling in the wire 26 by winding up the end portion of the wire 26 on the reel 52 during clockwise rotation of the motor 48 and for letting out the wound wire 26 during the counterclockwise rotation of the motor 48.

Figure 3:
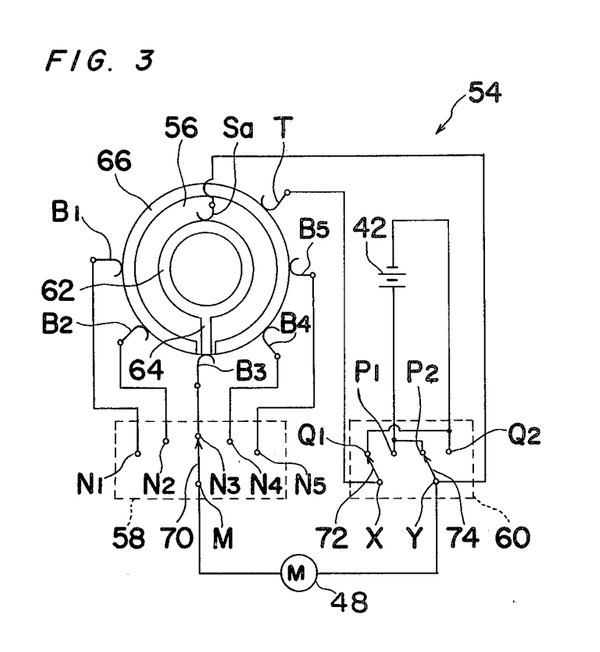
FIG. 3 is a circuit diagram for the control unit of the present invention.
Figure 4A:
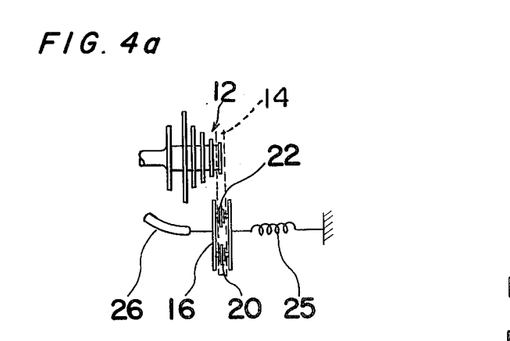
FIGS. 4a and 4b are schematic views of the transmission gears particularly showing the relation between the gears and the shifting means.
Figure 4B:
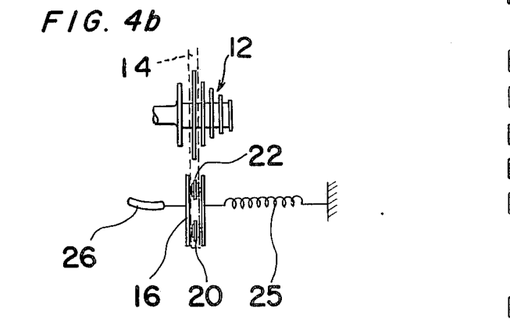

The rotation of the motor 48 is controlled by a control unit 54, as most clearly seen in FIG. 3, having a rotating disk or plate member 56 fixedly connected to the fourth gear 50d for rotating the disk 56 simultaneously with the fourth gear 50d.

Referring now to FIG. 3, the control unit 54 comprises the rotating disk 56, the motor 48, a first switch unit 58, a second switch unit 60 and the batteries 42. The rotating disk 56 made of insulating material such as synthetic resin has a ring shaped inner contact member 62 made of metal film bonded on a flat surface at the central portion thereof. The inner contact member 62 is integrally formed with a contact member 64 extending from one portion thereof outwardly towards the peripheral edge of the rotating disk 56. Provided along the peripheral edge of the rotating disk 56 is an outer contact member or actuating members 66 which is also made of strip of metal film. The outer contact member 66 starts from a portion closely adjacent to the extending contact member 64 and extends around the peripheral edge of the disk 56 to a portion closely adjacent to and on the opposite side of the extending contact member 64. This outer contact member 66 is also bonded on the peripheral edge of the disk 56. Thus, the inner and outer contact members are not electrically connected to each other. Disposed around the peripheral edge of the disk 56 are five sets of brushes or actuating members B1, B2, B3, B4 and B5 which are spaced apart from each other by a predetermined distance and are provided to slidingly pass along the peripheral edge of the disk 56, so that the brushes may contact the outer contact member 66, during the rotation of the disk 56. Provided adjacent to the brush B5 is a brush or actuating member T which is also so positioned as to contact the outer contact member 66 during the rotation of the disk 56. Disposed further close to the center of the disk 56 is a brush Sa which slidingly passes along the surface of the disk 56 so that the brush Sa may contact the inner contact member 62 during the rotation of the disk 56. It should be noted that the brushes B1 to B5, T and Sa are fixedly provided to a frame member (not shown) which is to be incorporated in the control box 30, so that all the brushes are in contact with the disk 56 during its rotation and during it stopped position.

Each of the five brushes B1 to B5 is connected to each one of the five terminals N1 to N5, respectively, of the switch unit 58, in which a main terminal M is selectively connected with any one of the five terminals N1 to N5, through a connecting arm 70. On the other hand, the brushes T and Sa are connected to the switch unit 60, in which the terminal X is connected to the brush T, while the terminal Y is connected to the brush Sa. Other terminals P1, P2, Q1 and Q2 in the switch unit 60 are connected to the source of power such as batteries 42, in which the terminals P1 and P2 are connected to the positive side of the batteries 42 while the terminals Q1 and Q2 are connected to the negative side of the batteries 42. The terminal Y is further connected to the motor 48.

It is to be noted that the switch units 58 and 60 are incorporated in the switch arrangement 32 provided on a handle 36 of the bicycle 2 and are operated by turning a knob 102 thereof while the disk 56 and the motor 48 are incorporated in the control box 30 and that necessary lead lines are led from the switch arrangement 32 to the control box 30 through a suitable pipe line 33 such as a flexible pipe made of polyvinyl chloride extended therebetween. The structure of the switch arrangement 32 is described in detail later in connection with FIGS. 5, 6a, 6b, 7, 8a and 8b. In the meantime, however, the connection of the switch units 58 and 60, as well as the manner how they operate in relation to the disk 56 and the motor 48 is described in detail hereinbelow.

Still referring to FIG. 3, each of the two terminals X and Y are connected to connecting arms 72 and 74, respectively, in which the connecting arm 72 connects the terminal X alternatively with the terminals Q1 and P1, while on the other hand, the connecting arm 74 connects the terminal Y alternatively with the terminals P2 and Q2. These connecting arms 72 and 74 are so designed as to move cooperatively with each other between a first connected position and a second connected position. The first connected position is established when the connecting arms 72 and 74 are connected to the terminals Q1 and P2, respectively, as shown in FIG. 3, while the second connected position is formed when the connecting arms 72 and 74 are connected to the terminals P1 and Q2, respectively.

The operation of the control unit 54 is described hereinbelow.

The control unit 54 shown in FIG. 3 corresponds with a third geared position, that is, when the endless chain 14 is engaged with the third gear 12c. In this third geared position, the motor 48 is not provided with any electric power from the batteries 42 since the connecting arm 70 is not in contact with the outer contact member 66. Thus the endless chain 14 is maintained to be engaged with the third gear 12c. When it is desired to shift-down the engagement to fourth geared position, that is when it is desired to have the endless chain 14 engage with the fourth gear 12d, the operator turns the knob 102 of the switch arrangement 32 to a fourth position for moving the connecting arm 70 to the fourth terminal N4 and also for moving the connecting arms 72 and 74 to the second connected position. Accordingly, the batteries 42 starts to supply electric power to the motor 48 through the established closed circuit of; batteries 42—terminal P1—terminal X—brush T—outer contact member 66—brush B4—terminal N4—connecting arm 70—main terminal M—motor 48—terminal Y—terminal Q2—batteries 42. Thus, the motor 48 runs to rotate the shaft thereof in the counterclockwise direction. During the rotation of the motor 48, the reduction gears 50 are rotated simultaneously to rotate the reel 52 in the counterclockwise direction for winding thereon the flexible wire 26 against the biasing force of the urging means 25 and thus proceeding the shift-down operation from third engaged position to the fourth engaged position. On the other hand, the rotation of the fourth reduction gear 50d simultaneously rotates the disk 56 therewith in the counterclockwise direction. During the rotation of the disk 56, the brush B4 slidingly passes along the surface of the outer contact member 66 to maintain the connection between the brush B4 and the outer contact member 66, thus maintaining the established closed circuit. When the disk 56 is thus rotated to have the brush B4 be in contact with the extending contact member 64, that is, when the reel 52 has sufficiently rotated to wind up the flexible wire 26 thereon by a predetermined length to carry out one shift-down operation, the motor 48 is disengaged from the batteries 42 and has its input terminals connected through a closed circuit of; motor 48—main terminal M—terminal N4—brush B4—extending contact member 64—ring shaped contact member 62—brush Sa—motor 48. Thus the motor 48, serving now as a generator, feeds back the power thereto to make a prompt stop thereof, thus one shift-down operation being completed.

When it is desired to shift-up the engagement from the fourth engaged position to a second engaged position, that is, when it is desired to have the endless chain 14 engage with the second gear 12b, the operator now turns the knob 102 of the switch arrangement 32 from the fourth position to the second position for moving the connecting arm 70 to connect the main terminal M with the terminal N2. Simultaneously with the movement of the connecting arm 70, the connecting arms 72 and 74 in the second switch unit 60 are shifted from the second connected position to the first connected position, by the turning operation of the knob 102. Accordingly, the batteries 42 starts to supply electric power to the motor 48 through the established closed circuit of; batteries 42—terminal P2—terminal Y—motor 48—main terminal M—connecting arm 70—terminal N2—brush B2—outer contact member 66—terminal T—terminal X—terminal Q1—batteries 42. During this connection, the motor 48 runs to rotate the shaft thereof in the clockwise direction, since the batteries are connected to the motor 48 in the reversed relation to the previous connection, that is, during the shift-down operation of the gears. Thus, the fourth reduction gear 50d is rotated simultaneously to rotate the reel 52 in the clockwise direction for letting out the wound flexible wire 26 to retreat the engagement of the endless chain 14 from the fourth engaged position to the second engaged position by the biasing force of the urging means 25. During the rotation of the fourth reduction gear 50d in the clockwise direction, the disk 56 is simultaneously rotated therewith in the clockwise direction to have the brush B2 to slidingly pass along the surface of the contact member 66, whereby the connection between the brush B2 and the contact member 66 is maintained to keep the motor 48 to rotate in the clockwise direction. When the disk 56 is thus rotated to have the brush B2 to reach the extending contact member 64, that is, when the shaft 52 has rotated sufficiently to pay out the flexible wire 26 therefrom by a predetermined length to carry out two shift-up operations, the motor 48 is disengaged from the batteries 42 and has its input terminals connected to each other in the similar manner as described above. Thus, the motor 48 serves as the generator to provide a prompt stop at the second geared position.

Figure 5:
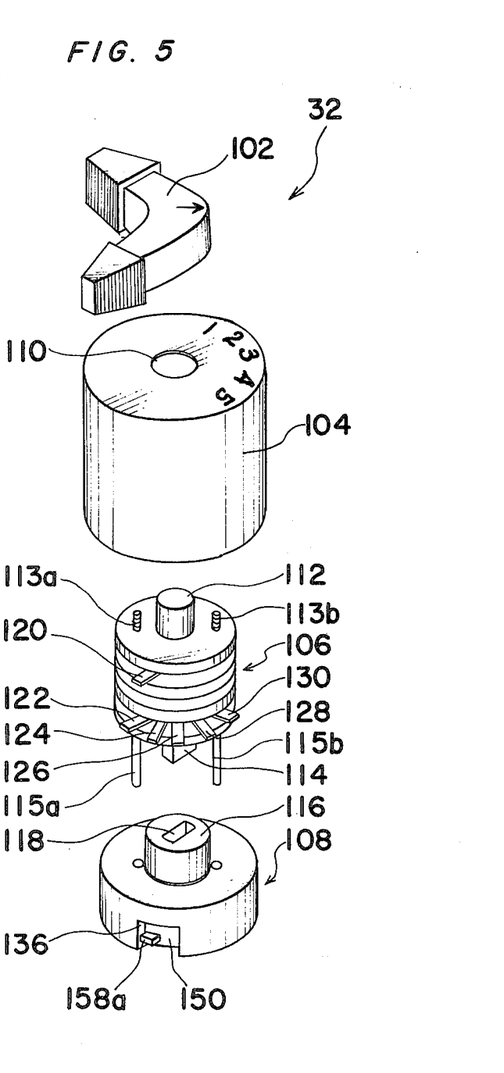
FIG. 5 is an exploded view of the switch arrangement.

Referring now to FIG. 5, there is shown an exploded view of the switch arrangement 32 to be provided adjacent to the grip 37 of the handle 36 of the bicycle 2 for operating the control unit 54 described above. The switch arrangement 32 comprises a cylindrical casing 104 having a small opening 110 formed at one end face thereof and a large opening (can not be seen) formed at the other end face thereof and a first rotary switch 106 which corresponds with the first switch unit 58 in the control unit 54. The first rotary switch 106 further has a rotatable projection or shaft 112 formed at top portion thereof to be inserted into the small opening 110 when the rotary switch 106 is housed in the casing 104 and a block shaped projection 114 at bottom portion thereof which is integrally or fixedly formed with the rotatable projection 112 for simultaneously rotating the block shaped projection 114 with the rotatable projection 112. The first rotary switch 106 has the main terminal 120 (corresponding with the main terminal M) for connecting thereto a lead line from the motor 48 and five projecting terminals 122, 124, 126, 128 and 130 (corresponding with the five terminals N5 to N1) for connecting thereto lead lines from the brushes incorporated in the control box 30. By rotating the projection 112, the main terminal 120 is selectively connected to either one of the five terminals 122, 124, 126, 128 and 130. The first rotary switch 106 is further provided with two upwardly extending arm projections 113a and 113b for fixedly holding the casing 104 therewith and two downwardly extending leg projections 115a and 115b for connecting a second rotary switch 108 to be provided under the first rotary switch 106.

The second rotary switch 108 which corresponds with the second switch unit 60 in the control unit 54 is also housed in the casing 104. The second rotary switch 108 has a receiving projection 116 having formed therein with a concaved portion 118 receiving therein the block shaped projection 114 for rotating the receiving projection 116 together with the block projection 114. Fixedly connected to the rotatable projection 112 from the outside of the casing is the knob 102 for rotating the rotatable projection 112.

Figures 6A, 6B, 7, 8A:
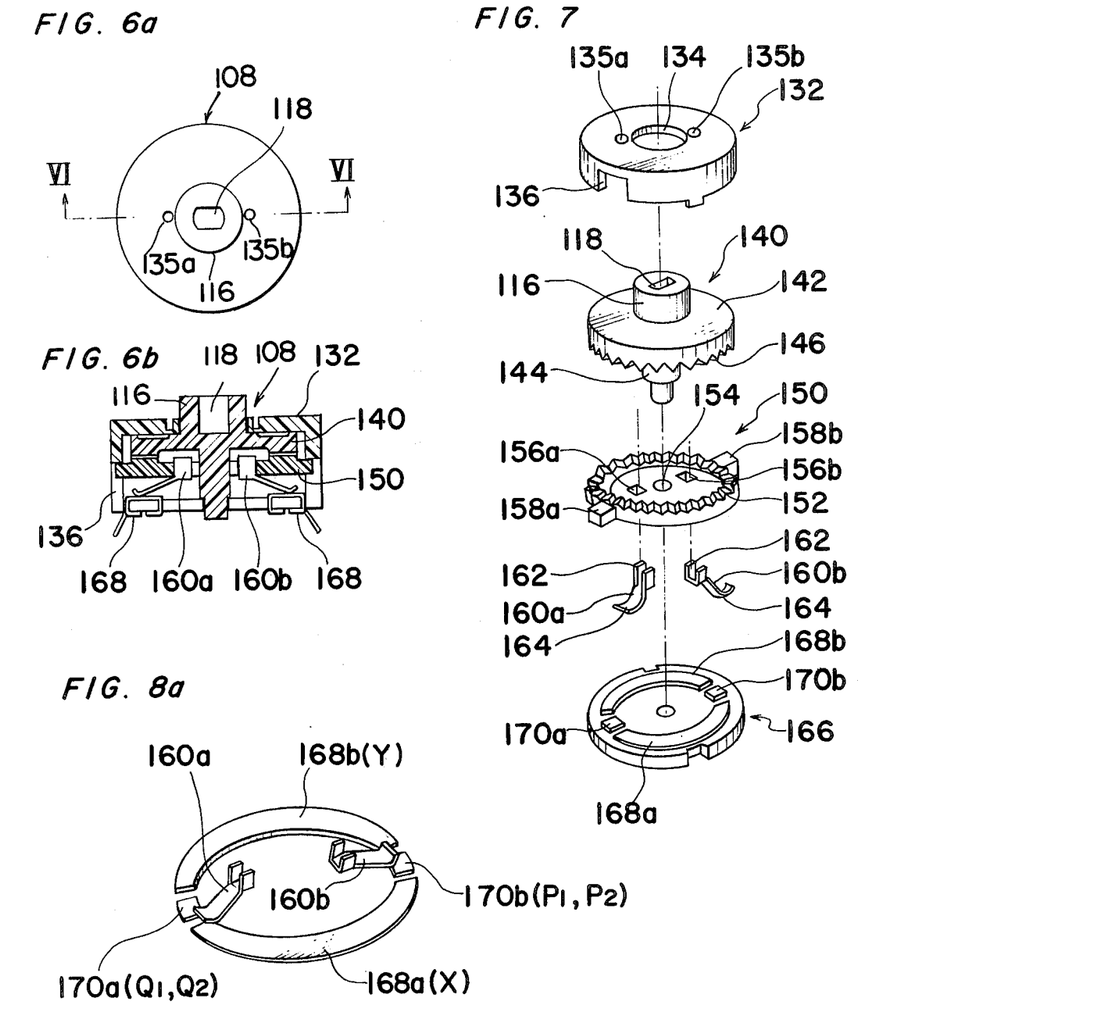

Referring to FIGS. 6a, 6b and 7, the second rotary switch 108 comprises a round shaped cover member 132, a pair of dog clutch members 140 and 150, two connecting reed members 160a and 160b and a round shaped base plate member or substratum 166, each of which is described hereinbelow.

The round shaped cover member 132 has a circular opening 134 formed at the central portion thereof, a smaller openings 135a and 135b for fixedly receiving therein the leg projections 115a and 115b, and two detent recesses 136, in which the only one recess at the front is seen, formed at the opposite sides of the peripheral wall thereof. The pair of dog clutch members includes a first dog clutch member 140 and a second dog clutch member 150. The first dog clutch member 140 has a flange portion 142 formed therearound about the shaft 144 thereof for providing a plurality of first claws 146 at the peripheral edge portions of the flange portion 142. It is to be noted that the upper portion of the shaft 144 corresponds with the receiving projection 116 described above for receiving therein the block shaped projection of the first rotary switch 106. The disk shaped second dog clutch member 150 has a plurality of second claws 152 for engaging therewith the first claws 146, an opening 154 at a center portion thereof for rotatably inserting therein the shaft 144 of the first dog clutch member 140, two square openings 156a and 156b formed adjacent to and opposite sides of the opening 154 and two side projections 158a and 158b formed on opposite sides of the peripheral edges of the dog clutch member 150 for restricting the rotation of the second clutch member 150 by the engagement of the side projections at the edge of the detent recesses. Each of the two connecting reed members 160a and 160b has a cubic portion 162 for fixedly inserting the same into the square opening 156 formed in the second dog clutch member 150 and an extending arm portion 164 acting as a connecting means. The round shaped base plate member 166 has two arcuate metal film terminal members 168a and 168b which are to be fixedly provided on the surface of the plate member 166 and two square terminals 170a and 170b provided between the two arcuate metal film terminal members 168a and 168b in a spaced relation and in a same plane, so as to have the reed members 160a and 160b, especially the edge portion of the arm portion 164 thereof, to slidingly pass along the members 168a, 168b, 170a and 170b. It should be noted that the area of each of the square terminal members 170a and 170b are approximately equal to the area of the edge portion of the arm portion 164 while the space formed between each of the square terminal member 170 and the arc shaped terminal member 168 is smaller than the area of the edge portion of the arm portion 164, so that the arm portion 164 may bridge over the square terminal member and the arc shaped terminal member during the sliding of the reed member over the terminal members for electrically connecting the square terminal member with the arcuate terminal member through the reed member. It is further to be noted that the terminal members 168a and 168b correspond with terminals X and Y, respectively, while the terminal member 170a corresponds with the terminals Q1 and Q2, and the terminal member 170b corresponds with the terminals P1 and P2.

Figure 8B:
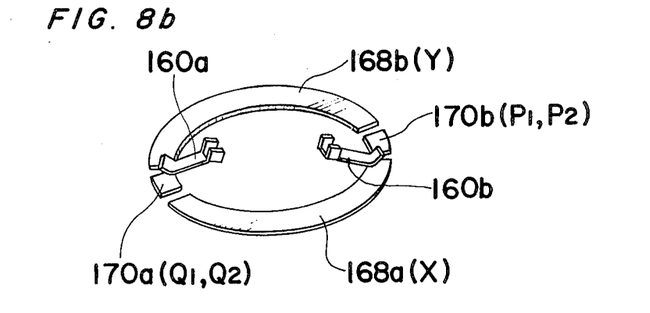

Referring to FIGS. 8a and 8b, there are shown two different connected positions of the reed members 160a and 160b. The first position, as shown in FIG. 8a, has the reed member 160a positioned directly over the terminal members 168a and 170a, while the reed member 160b is positioned directly over the terminal members 168b and 170b. This first position corresponds with the first connected position of the switch unit 60 as described before in connection with FIG. 3. The second position, as shown in FIG. 8b, has the reed member 160a positioned directly over the terminal members 168b and 170a, while the reed member 160b is positioned directly over the terminal members 168b and 170b. This second position corresponds with the second connected position of the switch unit 60.

Supposing that the endless chain 14 is now in the third engaged position and that it is desired to change the engagement to fourth engaged position. The operator turns the knob 102 has has been pointing the number "3", to point number "4". Accordingly, the shaft 112 of the first rotary switch 106 is rotated to connect the main terminal 120 with the fourth terminal 124 and the receiving projection 116 is rotated together with the shaft 112 for rotating the clutch members 140 and 150. Therefore, the reed members which have been in the first position are rotated to change the position to the second position. If, however, in the case where the reed members were already in the second position, then the first clutch member 140 clicks over the claws 152 to rotate together with the shaft 112, while the second clutch member 150 maintains its position to keep the reed members in the second position, since the two side projections 158a and 158b are engaged with side face of the detent recesses 136.

As is apparent from the foregoing description, the reed members are preferably brought into the second position when it is necessary to make the shift-down operation, while on the other hand, the reed members are brought back to the first position, in the similar manner, when it is necessary to make the shift-up operation.

Figure 9A:
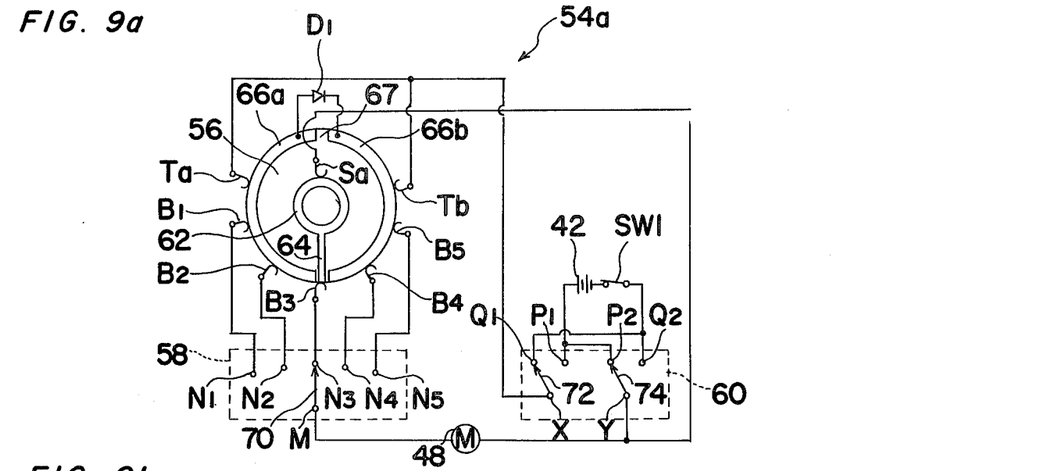
FIGS. 9a and 9b are similar views to FIG. 3, but particularly show modifications thereof.

Referring now to FIG. 9a, there is shown a control unit 54a which is the modification of the control unit 54 shown in FIG. 3. The control unit 54a in this modification has the contact member 66 divided into a first contact member 66a and a second contact member 66b at approximately central portion thereof for forming a disconnecting portion 67 therebetween. These two contact members 66a and 66b are, however, substantially connected to each other through a diode D1 directing from the first to second contact member. The brush T for connecting the outer contact member with the terminal X is also divided into two brushes Ta and Tb, in which the brush Ta is positioned at approximately opposite side of the brush B5 while the brush Tb is positioned at approximately opposite side of the brush B1. A switch SW1 may be connected to the batteries for turning on and off the control system 54a.

The disconnecting portion 66 as described above is particularly suitable for preventing the disk 56, i.e., the motor 48 from rotating undesirably when an erroneous operation is carried out.

The erroneous operation occurs when the operator, during off-state of the switch SW1, first erroneously turns the knob 102 from a previously set number, for example number "3", to a higher number, for example number "5", then returns back to a number between the previously set number and the higher number, for example number "4", and then he turns on the switch SW1 expecting one shift-down operation from the third engaged position to the fourth engaged position. In this case, the reed members are positioned in the first position to have the control unit 54 make the shift-up operation, so that the disk 56 incorporated in the previously described control unit 54 may undesirably rotate in the clockwise direction until the extending contact member 64, after having made almost a complete rotation, comes into contact with the fourth brush B4.

However, according to the control unit 54a, the disk 56 may only rotate to the position corresponding with the first geared position, that is when the extending contact member 64 being in contact with the brush B1, because the disconnecting portion 67 comes into contact with the brush Tb for disconnecting the motor 48 from the batteries 42. It is to be noted that the current in this case may not flow from the first contact member 66a to the brush Ta, because the diode D1 may block the current to flow therethrough.

In order to recover the erroneous operation, the operator first turns the knob 102 to the first position thereof, and then he may turn the knob 102 to any position he desires.

It is to be noted that a similar erroneous operation may occur when the operator, during off-state of the switch SW1, first erroneously turns the knob 102 from a previously set number, for example number "3", to a smaller number, for example number "1", then returns back to a number between the smaller number and the previously set number, for example number "2", and then he turns on the switch SW1 expecting one shift-up operation from the third engaged position to the second engaged position. This erroneous operation can also be corrected through turning of the knob 102 to the fifth position thereof.

Therefore, the control unit 54a can be operated without applying a high amount of manipulating force and the erroneous operations as described above can be easily corrected through simple operations, thus, preventing the rider from losing his balance during his ride on the bicycle.

Figure 9B:
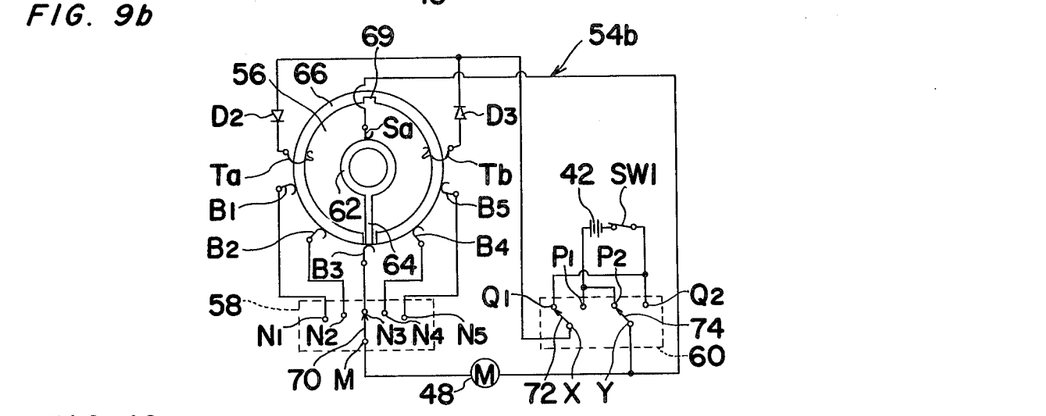

Referring to FIG. 9b, there is shown a control unit 54b which is another modification of the control unit 54 shown in FIG. 3. The control unit 54b in this modification has a recess 69 formed on the inside edge and at approximately central portion of the outer contact member 66, instead of portion 67 described above. The brushes Ta and Tb as described above are provided through diodes D2 and D3, respectively, to contact the outer contact member 66 from the inside edge thereof for disconnecting the brush Ta or Tb from the outer contact member 66 when such erroneous operation as described above should take place.

Figure 10:
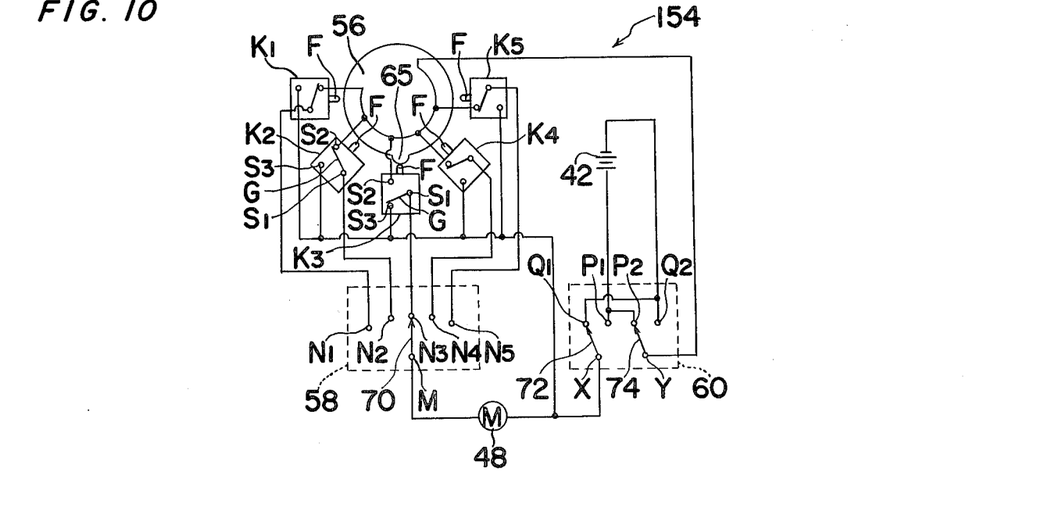
FIG. 10 is a similar view to FIG. 3, but particularly shows another embodiment thereof.

Referring to FIG. 10, there is shown a control unit 154 which is a second embodiment of the control unit 54 shown in FIg. 3. In the control unit 154 in this embodiment, the brushes B1 to B5 as described with reference to FIGS. 9a and 9b are replaced by five push-pull switches K1, K2, K3, K4 and K5. Each of the push-pull switches has an actuating member F and three terminals S1, S2 and S3, in which the S1 terminals are connected to one of the corresponding terminals N1 to N5, the S2 terminals are connected to each other and are further connected to the terminal Y in the switch unit 60 and the S3 terminals are connected to each other and are further connected to the terminal X in the switch unit 60. For operating these push-pull switches, the disk 56 is provided with a projection 65, instead of the contact members, for pushing in the actuating member F into the switches. The push-pull switch further has a connecting arm member G for connecting the first terminal S1 with either one of terminals S2 and S3. When the actuating member F is in the projected position, that is, the normal position, the terminal S1 is connected to the terminal S2, and when the actuating member F is in the inserted position, the terminal S1 is connected to the terminal S3. For operating these push-pull switches, the disk 56 is provided with a projection 65 on the peripheral edge thereof, instead of the contact members, for pushing in the actuating member F into the switches when the projection 65 comes into contact with the actuating member F. Other structures and features as well as the operation of the control unit 154 are similar to the previous control unit 54, so that the description therefor is omitted.

Figure 11A:
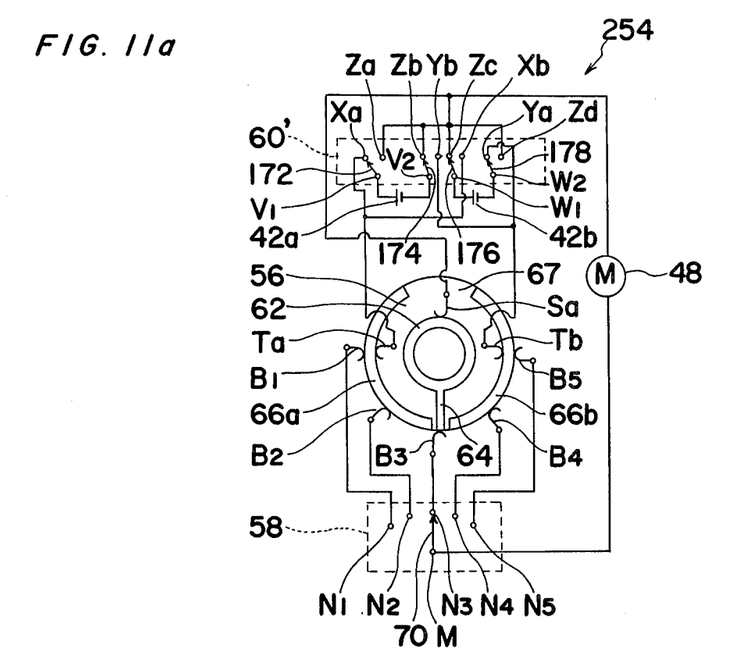
FIG. 11a is a similar view to FIG. 3, but particularly shows a further embodiment thereof.

Referring to FIG. 11a, there is shown a control unit 254 which is a third embodiment of the control unit 54 shown in FIG. 3. The control unit 254 in this embodiment has the contact member 66 divided into first and second contact members 66a and 66b as in the similar manner described above in connection with FIG. 9a. The contact members 66a and 66b, however, in this embodiment are not connected to each other and the disconnecting portion 67 is wider than before, while the brushes Ta and Tb to be connected with the second switch unit 60 are positioned closely adjacent to the brushes B1 and B5, respectively.

It is to be noted that the switch unit 60 described as cooperatively operated with the switch unit 58 is independently operated and is particularly designed for providing electric power from two batteries. Therefore, the second rotary switch 108 is not incorporated in the casing 104 but is provided on the handle or on the control box 30 independently of the switch arrangement 32. Accordingly, the connection between the switch unit shown in FIG. 11a (referred to as switch unit 60') and the brushes Ta and Tb is different from the connection described before. The connection is such that the terminals Xa and Xb are connected to the brush Ta, while the terminals Ya and Yb are connected to the brush Tb. Other terminals Za, Zb, Zc and Zd are connected to the brush Sa which is also connected to the motor 48. The remaining terminals V1, V2, W1 and W2 are provided for connecting the source of power such as batteries 42a and 42b, thereto. In connecting the batteries, the terminals V1 and W1 should receive the positive side of the battery while the terminals V2 and W2 should receive the negative side of the batteries. Each of the terminals V1, V2, W1 and W2 are connected to connecting arms 172, 174, 176 and 178, respectively, in which the connecting arm 172 connects the terminal V1 alternatively with the terminals Xa and Za, the connecting arm 174 connects the terminal V2 alternatively with the terminals Zb and Yb, the connecting arm 176 connects the terminal W1 alternatively with the terminals Zc and Xb, and the connecting arm 178 connects the terminal W2 alternatively with the terminals Ya and Zd. These connecting arms 172, 174, 176 and 178 are so designed as to move cooperatively with each other between a first connected position and a second connected position. The first connected position is established when the connecting arms 172, 174, 176 and 178 are connected to the terminals Xa, Zb, Zc and Ya, as shown in FIG. 11a, while the second connected position is when the connecting arms 172, 174, 176 and 178 are connected to the terminals Za, Yb, Xb and Zd, respectively. Normally the switch unit 60' is in the first connected position.

The operation of the control unit 254 is described hereinbelow.

The control unit 254 shown in FIG. 11a is at the position corresponding with the third geared position, in which position, the motor 48 is not provided with any electric power from the batteries 42a and 42b, since the connecting arm 70 is not connected with either one of the contact members 66a nor 66b. Thus the endless chain 14 is maintained to be engaged with the third gear 12c. When it is desired to shift-down the engagement to fourth geared position, the operator turns the knob 102 of the switch arrangement 32 to the fourth position for moving the connecting arm 70 to the fourth terminal N4. Accordingly, the battery 42b starts to supply electric power to the motor 48 through the established closed circuit of; battery 42b—terminal W1—terminal Zc—motor 48—main terminal M—connecting arm 70—terminal N4—brush B4—contact member 66b—brush Tb—terminal Ya—terminal W2—battery 42b. Thus the motor 48 runs to rotate in the counterclockwise direction. During the rotation of the motor 48, the reduction gears 50 are rotated simultaneously therewith to rotate the shaft 52 in the counterclockwise direction for winding thereon the flexible wire 26 against the biasing force of the urging means 25 and for shifting the chain down from the third engaged position to the fourth engaged position. While on the other hand, the rotation of the fourth reduction gear 50d simultaneously turns the disk 56 therewith to rotate in the counterclockwise direction. During the rotation of the disk 56, the brush B4 slidingly passes along the surface of the contact member 66 to maintain the connection between the brush B4 and the contact member 66. When the disk 56 is thus rotated to have the brush B4 to be in connection with the extending contact member 64, that is, when the shaft 52 has rotated enough to carry out one shift-down operation, the motor 48 is disengaged from the battery 42b and has its input terminals connected through a closed circuit of; motor 48—main terminal M—terminal N4—brush B4—extending contact member 64—ring shaped contact member 62—brush Sa—motor 48. The motor 48, serving now as a generator, feeds back the power to make a prompt stop thereof, thus one shift-down operation is completed.

When it is desired to shift-up the engagement from the fourth engaged position to the second engaged position, the operator turns the knob 102 of the switch arrangement 32 from the fourth position to the second position for moving the connecting arm 70 to connect the main terminal M with the terminal N2. Accordingly, the battery 42a starts to supply electric power to the motor 48 through the established closed circuit of; battery 42a—terminal V1—terminal Xa—brush Ta—contact member 66a—brush B2—terminal N2—connecting arm 70—main terminal M—motor 48—terminal Zb—terminal V2—battery 42a.

During this connection, the motor 48 runs to rotate the shaft thereof in the clockwise direction, since the batteries 42a supplies the power to the motor 48 in the reversed relation with respect to the previous connection, that is, during the shift-down operation of the gears. Thus, the fourth reduction gear 50d is rotated simultaneously to rotate the shaft 52 in the clockwise direction for loosening the wound flexible wire 26 to retreat the engagement of the endless chain 14 from the fourth engaged position to the second engaged position by the biasing force of the urging means 25. During the rotation of the fourth reduction gear 50d in the clockwise direction, the disk 56 is simultaneously rotated therewith in the clockwise direction to have the brush B2 slidingly pass along the surface of the contact member 66a, whereby the connection between the brush B2 and the contact member 66a is maintained to keep the motor 48 to rotate in the clockwise direction. When the disk 56 is thus rotated to have the brush B2 to reach the extending contact member 64, that is, when the shaft 52 has rotated sufficiently for paying out the flexible wire 26 therefrom by a predetermined length to carry out two shift-up operations, the motor 48 is disengaged from the battery 42a and has its input terminals connected to each other in the similar manner as described before, thus, the motor 48 serving now as the generator to make a prompt stop at the second geared position.

As is apparent from the foregoing descriptions, the battery 42a in this third embodiment is particularly used for rotating the motor 48 in the clockwise direction, that is, when the shift-up operation is carried out, while the battery 42b is particularly used for rotating the motor 48 in the counterclockwise direction, that is, when the shift-down operation is carried out. Since the motor 48 consumes higher power during the shift-down operation than the shift-up operation, the battery 42b is likely to be consumed faster than the battery 42a. Accordingly, there is provided the connecting arms 172, 174, 176 and 178 for exchanging the connection, upon turning to the second connected position, to have the battery 42a supply the power for rotating the motor 48 in the counterclockwise direction and to have the battery 42b supply the power for rotating the motor 48 in the clockwise direction. The operation in the second connected position is described hereinbelow.

When it is desired to have the gear position changed from the third geared position to the fourth geared position, the operator turns the knob 102 from the third position to the fourth position for connecting the main terminal M with the terminal N4. Thus the current starts to flow through the established closed circuit of; battery 42a—terminal V1—terminal Za—motor 48—main terminal M—connecting arm 70—terminal N4—brush B4—contact member 66b—brush Tb—terminal Yb—terminal V2—battery 42a. Thus, the motor 48 is rotated to make the suitable shift-down operation from the third to fourth geared position.

On the other hand, when it is desired to have the gear position changed from the fourth geared position to the second geared position, the operator turns the knob 102 from the fourth position to the second position for connecting the main terminal M with the terminal N2. Thus, the current starts to flow through the established closed circuit of; battery 42b—terminal W1—terminal Xb—brush Ta—contact member 66a—brush B2—terminal N2—connecting arm 70—main terminal M—motor 48—terminal Zd—battery 42b. Thus, the motor 48 is rotated to make the suitable shift-up operation from the fourth to second geared position.

Therefore, the control unit 254 can be prepared without simultaneous operation of the second switch unit 60′ with the first switch unit 58, thus it is not necessary to arrange the second switch unit 60′ to cooperatively move with the first switch unit 58. Accordingly, there is no need to provide the second rotary switch 108 in the casing 104, thus simplifying the structure of the switch arrangement 32.

Figure 11B:
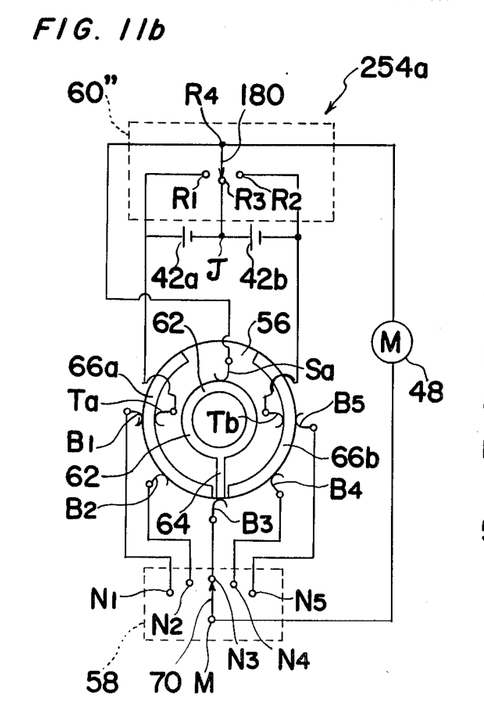
FIGS. 11b and 11c are similar views to FIG. 11a, but particularly show modifications thereof.

Referring to FIG. 11b, there is shown a control unit 254a which is a modification of the control unit 254 shown in FIG. 11a. In the control unit 254a in this modification, the switch unit 60′ as described above is replaced by a switch unit 60″ for simplifying the structure thereof. The switch unit 60″ has two batteries 42a and 42b which are connected in series, between two terminals R1 and R2, and includes a neutral terminal R3 connected to a junction J between the two batteries, a common terminal R4 connected to the motor 48 and the brush Sa and a connecting arm 180 for connecting the common terminal R4 with either one of the terminals R1, R2 and R3. Normally, the connecting arm 180 is in a position to connect the common terminal R4 with the terminal R3. It is to be noted that the switch unit 60″ is incorporated in the second rotary switch 108 as described above for connecting the terminal R4 with the terminal R1 during the shift-down operation of the gears and for connecting the terminal R4 with the terminal R2 during the shift-up operation of the gears. The operation of this control unit 254a is described hereinbelow.

When it is desired to have the gear position changed from the third geared position to the fourth geared position, the operator turns the knob 102 from the third position to the fourth position for connecting the main terminal M with the terminal N4 and also for connecting the terminal R4 with the terminal R1. Thus the current starts to flow through the established closed circuit of; batteries 42a and 42b—terminal R1—terminal R4—motor 48—main terminal M—terminal N4—brush B4—contact member 66b—brush Tb—batteries 42b and 42a. Thus, the motor 48 is rotated to make the suitable shift-down operation from the third to fourth geared position at a faster rate than previous embodiment, because the batteries are provided in series relation.

On the other hand, when it is desired to have the gear position changed from the fourth geared position to the second geared position, the operator turns the knob 102 from the fourth position to the second position for connecting the main terminal M with the terminal N2 and also for connecting the terminal R4 with the terminal R2. Thus, the current starts to flow through the established closed circuit of; batteries 42a and 42b—brush Ta—contact member 66a—brush B2—terminal N2—main terminal M—motor 48—terminal R4—terminal R2—batteries 42b and 42a. Accordingly, the motor 48 is rotated to make the suitable shift-up operation from the fourth to second geared position at a faster rate than previous embodiment, because the batteries are provided in series relation.

According to this embodiment, the batteries 42a and 42b are so connected to supply the motor with more power than the previous embodiment while the batteries may be consumed at the same rate so that there will be no unbalance in the batteries.

Figure 11C:
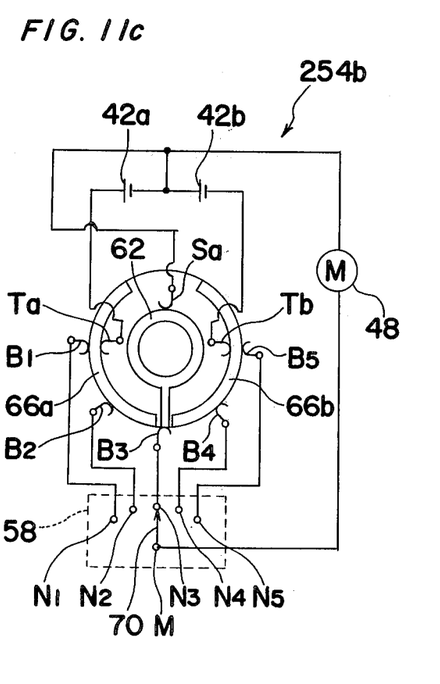

Referring to FIG. 11c, there is shown a control unit 254b which is another modification of the control unit 254 shown in FIG. 11a. The control unit 254b in this modification has no switch unit for changing the connection of the batteries. The batteries 42a and 42b in this modification are connected in series and are connected between the brushes Ta and Tb. The common junction J between the two batteries is connected to the motor 48 and to the brush Sa. The operation of this control unit 254b is described hereinbelow.

When it is desired to have the gear position changed from the third geared position to the fourth geared position, the operator turns the knob 102 from the third position to the fourth position for connecting the main terminal M with the terminal N4. Thus, the current starts to flow through the established closed circuit of; battery 42b—motor 48—main terminal M—connecting arm 70—terminal N4—brush B4—contact member 66b—terminal Tb—battery 42b. Accordingly, the motor 48 is rotated to make the suitable shift-down operation from the third to fourth geared position.

On the other hand, when it is desired to have the gear position to be changed from the fourth geared position to the second geared position, the operator turns the knob 102 from the fourth position to the second position for connecting the main terminal M with the terminal N2. Thus, the current starts to flow through the established closed circuit of; battery 42a—brush Ta—contact member 66a—brush B2—terminal N2—connecting arm 70—main terminal M—motor 48—battery 42a, and the motor 48 is rotated to make the suitable shift-up operation from the fourth to second geared position.

Accordingly, as it has been described fully, the control system of the present invention can be operated with such an easy manipulation, for example a finger tip manipulation, that the rider of the bicycle is free from the danger of losing balance during gear change operation, while the control system itself is comparatively simple and can readily be incorporated in the conventional bicycles having multiple transmission gears.

Figure 12A:
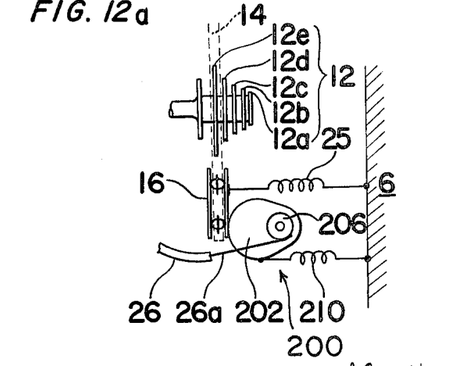
FIGS. 12a, 12b and 12c are similar views to FIGS. 4a and 4b, but particularly showing modifications hereof.
Figure 12B:
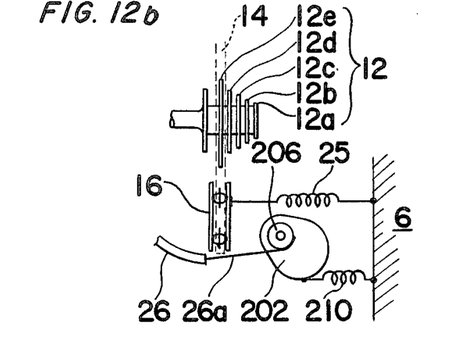
Figure 12C:
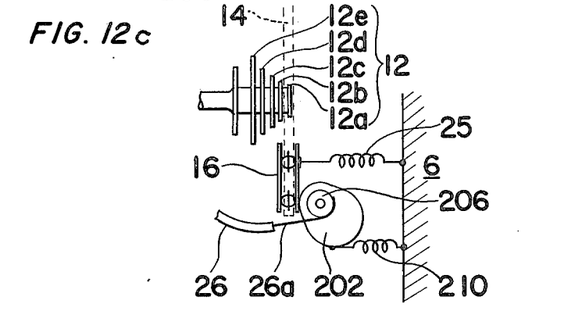

Referring to FIGS. 12a, 12b and 12c, there are shown modifications of the chain shifting mechanism described above in connection with FIGS. 4a and 4b. The chain shifting mechanism shown in FIGS. 12a, 12b and 12c has a shifting member 200 provided adjacent to the guiding member 16 for moving the guiding member 16 between the shifted position and the retreated position, upon rotation of a cam member 202 provided in the shifting member 200.

Before the description for the movement of the shifting member 200 proceeds, the structure thereof is described hereinbelow in connection with FIGS. 13 and 14.

Figure 13:
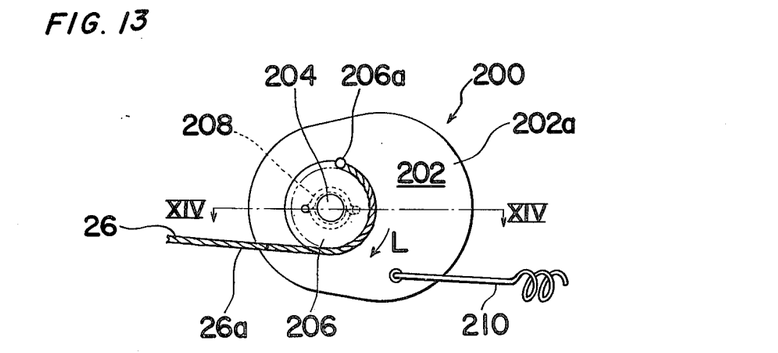
FIG. 13 is a front elevational view of a shifting member.
Figure 14:
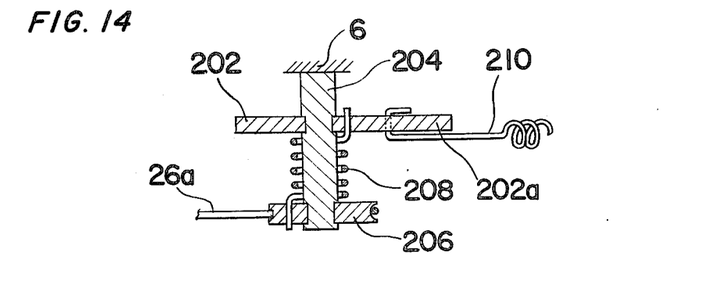
FIG. 14 is a cross sectional view taken along the line XIV—XIV shown in FIG. 13.

Referring particularly to FIGS. 13 and 14, the shifting member 200 comprises the cam member 202 rotatably mounted on a shaft 204 which is fixedly provided on the frame 6 of the bicycle 2, a pulley 206 also rotatably mounted on the shaft 204 and a coil spring 208 mounted on the shaft 204 between the cam member 202 and the pulley 206 with its one end engaged with the cam member 202 and the other end engaged with the pulley 206 for rotating the cam member 202 cooperatively with the rotation of the pulley 206.

The shifting member 200 further includes an urging member 210 having one end thereof connected to the frame 6 and the other end connected to the cam member 202 at expanded portion 202a thereof. It is to be noted that the urging force of the urging member 210 is considerably smaller than that of the coil spring 208. The urging member 210 is so arranged as to urge the expanded portion 202a of the cam member 202 to be spaced away from the guiding member 16.

Connected to the pulley 206 is an end portion 26a of the flexible wire 26, the extreme end of which is fixedly connected to a holding member 206a, while the end portion 26a is partially wound up on the pulley 206. Upon application of the pulling force, the expanded portion 202a of the cam member 202 slidingly engages with the guiding member 16 against the urging force of the coil spring 208 and the urging member 210.

The description is now directed to the movement of the chain shifting mechanism described above.

Referring particularly to FIG. 12a, the guiding member 16 shown therein is in the shifted position for guiding the endless chain 14 along the auxiliary gears 20 and 22 to engage with the fifth gear 12e. When it is desired to change the engagement of the endless chain 14 from the fifth engaged position to the first engaged position the rider may turn the knob 102 which has been pointing number "5" to point number "1" to shift-up the engagement of the endless chain 14 from the fifth engaged position to the first engaged position. Then, the motor 48 rotates to turn the reel 52 for causing the flexible wire 26 to pay out therefrom. Accordingly, the cam member 202 together with the pulley 206 rotates in a counterclockwise direction, by the urging force of the urging member 210, to have the expanded portion 202a spaced away from the guiding member 16. Since the coil spring 208 has stronger urging force than the urging member 210, the coil spring 208 may maintain, during this counterclockwise rotation, the relation between the cam member 202 and the pulley 206. Thus, the urging member 210 causes the cam member 202 to change its position as shown in FIG. 12b.

In the state as described above, corresponding to FIG. 12b, the guiding member 16 maintains its shifted position unless the rider further actuates the pedal to move the endless chain 14. After then, upon movement of the pedal, the guiding member 16 displaces its position, by the urging force of the urging means 25, until the guiding member 16 comes into contact with the rotated cam member 202. Thus the endless chain 14 changes its position from the fifth engaged position to the first engaged position. Accordingly, the guiding member 16 as well as the chain 14 passing therethrough is brought to a position as shown in FIG. 12c.

On the other hand, when it is desired to change the endless chain 14 from the first engaged position to the fifth engaged position, the rider may turn the knob 102 for changing the pointing number thereof from the number "1" to number "5". Then, with respect to the turning of the knob 102, the motor 48 rotates to turn the reel 52 for winding up the flexible wire 26 thereon. If, during the movement of the motor 48, the endless chain 14 is not being moved, that is, when the pedal is not being moved, the guiding member 16 is tightly held in the retreated position for restricting the cam member 202 in the position shown in FIG. 12c, together with the urging member 210. Accordingly, by pulling force of the flexible wire 26, only the pulley 206 is rotated, while the cam member 202 is maintained in the position described above. Thereafter, upon movement of the pedal, the guiding member 16 is released from being tightly held in the retreated position, and thus, the cam member 16 is released from the restriction. Accordingly, the cam member 202 starts to rotate, by the urging force of the coil spring 208, in the clockwise direction to slidingly move the guiding member 16 towards the retreated position. Thus, the cam member 202 is brought to a position as shown in FIG. 12a. It is to be noted that the pulling force of the flexible wire 26 is stronger than the urging force of the coil spring 208, while the urging force of the coil spring 208 is stronger than that of the urging member 210, so that there will not be erroneous movement in the operation of the cam member 202, as well as that in the guiding member 16.

Although the foregoing description is particularly directed to the movement of the guiding member 16 between the shifted position and the retreated position, the guiding member 16 as well as the endless chain 14 passing therethrough can be shifted to other positions such as second, third or fourth engaged positions, in the similar manner as described above.

Since the guiding member 16 in the above described chain shifting mechanism does not directly receive the pulling force of the wire 26, but receives indirectly through the pulley 206 and the cam member 202, it is possible to turn the knob 102 for actuating the control unit regardless of the movement of the endless chain 14.

Although the present invention has been fully described by way of examples of the preferred embodiments, it is to be noted that various changes and modifications are apparent to those skilled in the art without departing the scope thereof. Accordingly, the present invention is not to be limited by the embodiments, but such changes and modifications should be construed as included within the scope thereof unless otherwise departing therefrom.

What is claimed is:

1. A control system for use in a multiple speed transmission system having a power transmission mechanism defining a power delivery path between driving member means and driven member means for controlling the relative motion between said driving member means and driven member means, said power transmission mechanism having a plurality of coaxially aligned transmission gears provided in said power delivery path and each transmission gear having a different diameter, an endless chain for engaging said delivery path with one of said transmission gears and guiding means for guiding said endless chain to engage with one of said transmission gears and to change the instantaneous power to be transmitted through the transmission mechanism with respect to changes of the transmission gear to be engaged with said endless chain, said control system comprising:

(a) a shifting means including a reversible motor, a winding reel connected to said motor, a flexible wire connected between the winding reel and said guiding means for making a shifting operation of said endless chain during operation of said shifting means, upon receipt of either one of advance and retreat movement of said flexible wire caused by the rotation of said reversible motor, an urging means connected to said guiding means for shifting-down said guiding means upon a winding up operation of said flexible wire onto said reel during the rotation of the motor in one direction and shifting-up said guiding means upon paying out operation of said flexible wire from said reel by the pulling force of said urging means during the rotation of said motor in the other direction;

(b) a source of DC electric power;

(c) a switch means including a first switch unit having a main terminal electrically connected to said reversible motor, a plurality of selective terminals and a connecting arm member for selectively connecting one of said selective terminals with said main terminal and a second switch unit connected to the reversible motor and also to the DC power source, said connecting arm in said first switch unit movable between first and second positions and engageable with said selective terminal one at a time, the first and second positions being occupied by two of said selective terminals, said connecting arm being moved towards the first position for effecting shifting-down of said guiding means and moved towards the second position for effecting shifting-up of said guiding means, said second switch unit being connected to said DC power source in one direction when said connecting arm is moved towards the first position and in the other direction when said connecting arm is moved towards the second position;

(d) a plate member mechanically connected to said reversible motor, said motor moving said plate member between an initial position and a terminated position in relation to the rotation of said reversible motor;

(e) an actuator member, electrically connected to said second switch unit, provided on said plate member;

(f) a plurality of actuating members, each electrically connected to said selective terminal in said first switch unit, each of said actuating members provided adjacent to said plate member for actuating said actuating member as said actuator member moves past said actuating member, whereby, upon manually turning on said switch means to connect said main terminal with one of said selective terminals through said connecting arm, said power source provides electric power to said shifting means through said switch means for operating said shifting means until said actuator member has moved past said actuating member for disconnecting said shifting means from said power source.

2. A control system as claimed in claim 1 further comprising a reduction gears connected between said reversible motor and said winding reel.

3. A control system as claimed in claim 1, wherein said actuator member is a projection provided on the edge of the plate member.

4. A control system as claimed in claim 3, wherein said plurality of actuating members are plurality of push-pull switches electrically connected to said power source.

5. A control system as claimed in claim 1, wherein said actuator member is a first contact member electrically connected to said power source.

6. A control system as claimed in claim 5, wherein said plurality of actuating members are a plurality of brush members.

7. A control system as claimed in claim 6 further comprising a second contact member provided on said plate member adjacent to and in spaced relation to said first contact member, said second contact member being connected to said motor for short circuiting said motor after said first contact member having moved past said brush means, thereby actuating said motor as a generator to make a prompt stop of the motor.

8. A control system as claimed in claim 6, wherein said plate member is a disk having the center thereof connected to an axis of one of said reduction gears for rotating the disk.

9. A control system as claimed in claim 8, wherein said first contact member is a metal film provided around peripheral edge portion of said disk, said metal film having at least one section opened for the electrical disconnection between the metal film and the brush means.

10. A control system as claimed in claim 8, wherein said brush means are positioned around said peripheral edge of said disk, said brush means being separated from each other by a predetermined distance.

11. A control system as claimed in claim 8, wherein said metal film includes a first film member and a second film member, said first and second film members being provided on opposite sides of one peripheral edge portion of said disk in a spaced relation, said first film member connecting said power source to rotate the motor in one direction and said second film member connecting said power source to rotate the motor in the other direction.

12. A control system as claimed in claim 11, wherein said reversible motor is a DC motor and said power source is a DC power source.

13. A control system as claimed in claim 12, wherein said switch means further includes a second switch unit cooperatively moved together with said first switch unit for providing DC power in one direction to said DC motor during said shift-up operation and for providing DC power in the other direction to said DC motor during said shift-down operation.

14. A control system as claimed in claim 13 further comprising means for moving said plate member towards either one of said initial position and terminated position, regardless of the positioning of the connecting arm member, when said second switch unit loses cooperative relation with said first switch unit.

15. A control system as claimed in claim 14, wherein said means including a rectifying means connected between said first and second film members for allowing current to flow therethrough in one direction from one of said film members towards the other of said film members.

16. A control system as claimed in claim 15, wherein said rectifying means is a diode.

17. A control system as claimed in claim 1, wherein said first switch unit is a rotary switch being manually operated to connect said main terminals with one of said selected terminal.

18. A control system as claimed in claim 1, wherein said reversible motor is a DC motor and said power source is a DC power source.

19. A control system as claimed in claim 18, wherein said DC power source is a pair of DC power source units, each unit connected to said DC motor in different polarity through a switch unit for selectively connecting said DC motor with one of said DC power source units for selectively rotating said DC motor in one direction selected from forward direction and reverse direction.

20. A control system as claimed in claim 18, wherein said switch means further includes a second switch unit cooperatively moved together with said first switch unit for providing DC power in one direction to said DC motor during said shift-up operation and for providing DC power in the other direction to said DC motor during said shift-down operation.

21. A control system as claimed in claim 20 further comprising means for moving said plate member towards either one of said initial position and terminated position, regardless of the positioning of the connecting arm member, when said second switch unit loses cooperative relation with said first switch unit.

22. A control system as claimed in claim 20, wherein said second switch unit comprising a casing, a substratum, a pair of arcuate terminal members connected to said motor and disposed on said substratum to form a circle therewith, a pair of square terminal members connected to said power source and each disposed between the edges of said pair of arcuate terminal members in a spaced relation, a pair of reed members provided above said substratum for sliding over arcuate terminal members and square terminal members and a pair of clutch members including a lower clutch member having means for fixedly supporting said pair of reed members and an upper clutch member connected to said first switch means for rotating said lower clutch means during rotation of said first switch means, said lower clutch member being provided therewith a restricting means for restricting the rotation thereof between a rotated position and a restricted position, whereby each of said reed members, during said rotated position, connects one of said arcuate terminal member with one of said square terminal member, and, during said restricted position, connects the other of said arcuate terminal member with one of said square terminal member.

23. A control system as claimed in claim 1, wherein said shifting means further comprises a biasing means provided between said flexible wire and said guiding means for biasing said guiding means, upon receipt of either one of said advance and retreat movement of said flexible wire.

24. A control system as claimed in claim 23, wherein said biasing means comprising a cam member rotatably mounted on a shaft, a pulley rotatably mounted on said shaft and having tip end of said flexible wire connected thereto, a spring means connected between said cam member and said pulley member for maintaining the relation between the cam member and the pulley member and an urging means connected to said cam member for urging said cam member to separate apart from said guiding means, whereby said cam member rotates, upon advance of said flexible wire, in one direction to separate apart from said guiding means for shifting said guiding means in one direction and, upon retreat of said flexible wire, the cam moves in the other direction to slidingly engage with said guiding means, against said urging means, for shifting said guiding means in other direction.

25. A control system as claimed in claim 24, wherein urging force of said spring means is stronger than that of said urging means, and urging force of said flexible wire being stronger than that of said spring means.

26. A control system as claimed in claim 1 wherein said control system is positioned adjacent to said transmission mechanism.

* * * * *